Figure 1:
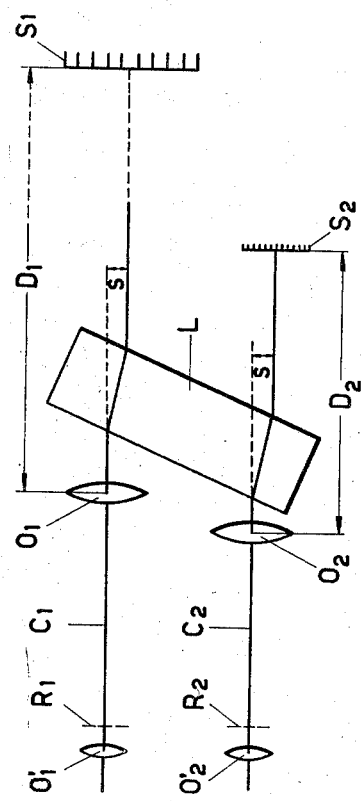

May 21, 1957 C. MAZZON 2,792,741
DEVICE FOR MEASURING THE PARALLEL DISPLACEMENT OF THE
LINE OF SIGHT FOR OPTICAL INSTRUMENTS
Filed March 25, 1953

INVENTOR.
Corrado Mazzon
BY

United States Patent Office 2,792,741
Patented May 21, 1957

2,792,741

DEVICE FOR MEASURING THE PARALLEL DISPLACEMENT OF THE LINE OF SIGHT FOR OPTICAL INSTRUMENTS

Corrado Mazzon, Milan, Italy

Application March 25, 1953, Serial No. 344,584

2 Claims. (Cl. 88—1)

This invention relates to an improved and novel means for measuring the parallel displacement of the line of sight for a telescope or similar optical instrument.

The present invention comprehends the provision of a microscope having the axis of its optical system parallel to the axis of the telescope, the microscope being disposed alongside the telescope, which reads on an external, spaced stadia, and the microscope reading on a graduated scale which is graduated in accordance with the external stadia.

The displacement of the axis of collimation or line of sight of the telescope is attained in optical instruments, e. g. in dumpy levels, by inserting on the optical axis of the telescope a plate glass with plane and parallel faces and of known thickness and refractive index. It is made to rotate about an axis normal to the axis of the telescope. As a function of the angle $i$ of rotation, of the angle $r$ of refraction of the light rays and of the thickness $a$ of the plate, the displacement $s$ of the axis of collimation is given by the following formula:

$$s = a \frac{\sin(i-r)}{\cos r}$$

The simplest way of evaluating this displacement on the instrument consists in gauging a graduation on a drum pivoted on the axis of the plane parallel plate. However, since the displacement of the axis of collimation is not in linear relationship with the angle of rotation of the plate and of the drum, said graduation will not be linear but for small angles, and to obviate this inconvenience recourse has been had to complicated mechanical contrivances whereby the graduation connected to the drum with which the operator rotates the plate can become linear within the limits of desired approximation.

This causes constructional difficulties which have adverse effect also upon the good preservation of the mechanisms, and causes unaccuracies in the gauging of the scale as well. The mechanisms will inevitably have a certain play, so that the relationship between the actual displacement of the plate and the rotation of the drum will become altered thereby, and so will the relationship between the latter and the graduation marked on the scale.

With the present invention, the use of a system and of a device is proposed for measuring without said inconveniences, evaluating the displacement not by way of the rotation but instead in a direct manner depending on the rotation of the plate.

The system and device are characterized by a secondary optical system the axis of which is parallel to the principal optical system of the telescope of the instrument, said secondary system undergoing, by passage through the same plate, an equal displacement of its axis, and further characterized by a graduated scale that is read through the secondary optical system and that is in relationship of proportionality with that read through the principal one.

Figure 2:
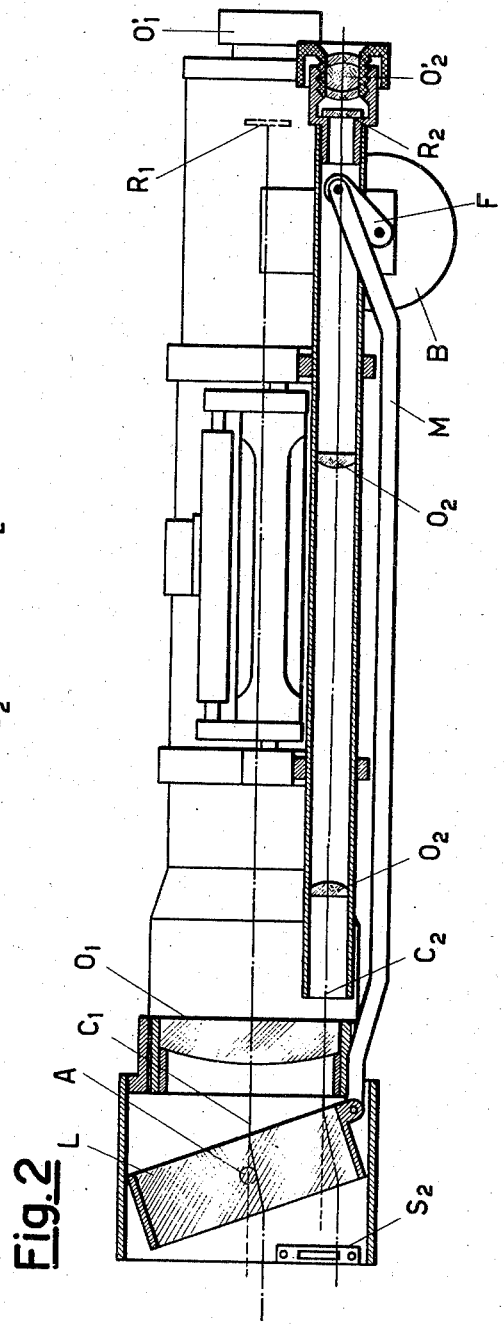

In the accompanying drawing, Fig. 1 illustrates by way of example how the device is embodied, by means of its optical diagram, while Fig. 2 illustrates the application of the device to a dumpy level.

In Fig. 1, $C_1$ is the axis of collimation of the telescope, and L is the plane parallel plate: the rotation of L about an axis normal to the sheet will displace the sighting line by an amount $s$ and, therefore, the observer will see the stadia $S_1$, the image of which forms on the reticle $R_1$, displaced by $s$. Said displacement will appear more or less great depending on the distance $D_1$ of the stadia, that is, depending on the angle under which from the centre of the objective $O_1$, one sees $s$ at the distance $D_1$.

Now a second optical system is embodied which has its axis of collimation $C_2$ parallel to the former, and a small stadia $S_2$, close to the objective $O_2$, parallel to the first stadia, is sighted.

The rotation of the plate will cause a displacement of this secondary optical system, again equal to $s$: the distance $D_2$ of the small stadia $S_2$ being small at will, the said displacement of the axis of collimation can be observed under any angle at will.

It will be seen how the graduation of the stadia can be strictly linear, since it repeats the graduation of the stadia $S_1$. It is also necessary that the graduation of the stadia $S_2$ be of length equal to that of one interval of the stadia $S_1$ and, therefore, the unit of this second graduation is an accurate submultiple of said unit.

The stadia $S_2$ is plotted on a transparent glass close to the objective $O_2$. Its application to an instrument is shown by way of example in Figure 2. In this figure the various parts already represented in the diagram of Figure 1 are indicated with the same references. This figure however illustrates how the application of the measuring device on a dumpy level may be embodied. There is provided, in the proximity of the eye-piece of the two optical systems, a wheel B, the movement of which is transmitted by way of the crank F and the connecting rod M to the plane parallel plate L; the mentioned system transmits the movement of rotation of said wheel to said plate, which thus rotates about a horizontal axis.

The small graduated scale $S_2$ is accommodated in front of the plane parallel plate, and through the optical system of the telescope $C_2$, readings can be performed thereon. The optical system represented by the lenses $O_2$ transports the images of the stadia $S_2$ into the focal plane of the eye-piece of the system.

Since the angle through which the lamina L is displaced is constant throughout all the points of the lamina itself (and it cannot be otherwise) and since the aim of the auxiliary optical device of the invention is just to read a fraction of interval of the sighted staff, it appears that the displacement $s$ of the line of sight of the telescope is exactly "repeated" by the line of sight of the auxiliary optical system.

It should be recalled that $D_1$ is a variable distance, as the obvious requirements for an operative instrument require, while $D_2$ is a fixed distance.

Thus, if it is desired that the reading on $S_2$ be an absolute reading, i. e. not a differential reading, it is necessary that the lenght of $S_2$ be a submultiple of the unit interval of $S_1$. In other words, when the lamina L is inoperative, i. e. not tilted forwardly, the reading taken on $S_2$ is zero. The only limitation is that the height $S_2$ must coincide with a unit interval of $S_1$: irrespective of the mutual relationship between the distances $D_1$ and $D_2$, the stadia interval, to which the displacement $s$ corresponds, is viewed under the same angle by the main optical system, i. e. that of the training telescope and by the auxiliary optical system.

It is not possible, of course, to divide $S_1$ in centimeters and $S_2$, say, in inches. The distance $D_2$ is small with respect to $D_1$ and is as small as possible to enable the level man to appreciate, empirically, the possible "between lines of $S_2$" reading and to obtain thus further accuracy. In other words, to simplify the question, let us pretend that, initially, the line of sight of the telescope points exactly at a graduation line of $S_1$ and the lamina be inoperative: in this instant the reading on $S_2$ is zero. If we tilt the lamina until aiming the next line of $S_2$, the same angle of tilt will be necessary for displacing by $s$ both the lines of sight, that is to say, to read, on $S_2$, the extreme end of the same scale $S_2$. Thus, for the intermediate readings, it will be possible to read on $S_2$ that fraction of interval of graduation on $S_1$ concerned.

What I claim is:

1. A device for measuring the displacement of the axis of collimation for a telescope reading on an external, spaced stadia, said telescope including an objective and a transparent plate disposed in front of the objective and having plane and parallel faces, said plate being rotatable about an axis transverse to the axis of the optical system of the telescope to cause displacement of the axis of the optical system of the telescope; said device comprising a microscope disposed alongside the telescope and having an optical system whose axis is parallel to the axis of the optical system of the telescope, the axis of the optical system of the microscope being displaced, by passage through the plate, equally to the displacement of the axis of the optical ssytem of the telescope and a graduated scale fixed at the front end of the microscope at a constant distance forward of the plate and in a position parallel to the external stadia on which the telescope reads, said microscope reading on said scale.

2. A device as claimed in claim 1, wherein the length of the graduated scale is equal to the length of one interval of graduation of the external stadia, said scale being divided into a plurality of equal parts.

References Cited in the file of this patent

UNITED STATES PATENTS 2,564,780    Fontaine _____ Aug. 7, 1951

OTHER REFERENCES

Microtecnic, vol. V. No. 2, March - April 1951, pages 93–96.